US007822933B1

(12) United States Patent
Sontakke et al.

(10) Patent No.: US 7,822,933 B1
(45) Date of Patent: Oct. 26, 2010

(54) ENABLING OFF-HOST DATA MIGRATION USING VOLUME TRANSLATION MAPPINGS, SNAPPOINT MAPS AND LINKED VOLUME TECHNOLOGIES

(75) Inventors: Nikhil Keshav Sontakke, Pune (IN); Rahul M. Fiske, Pune (IN); Anuj Garg, Pune (IN); Niranjan S. Pendharkar, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 722 days.

(21) Appl. No.: 11/649,571

(22) Filed: Jan. 4, 2007

(51) Int. Cl.
G06F 12/00 (2006.01)
G06F 13/00 (2006.01)
G06F 13/28 (2006.01)
G06F 7/00 (2006.01)
G06F 17/00 (2006.01)

(52) U.S. Cl. .................. 711/162; 711/150; 711/165; 711/168; 707/648; 707/649

(58) Field of Classification Search .......... 711/150, 711/162, 165, 168; 707/648–649
See application file for complete search history.

(56) References Cited

U.S. PATENT DOCUMENTS

| 5,875,479 | A | * | 2/1999 | Blount et al. | 711/162 |
| 6,076,148 | A | * | 6/2000 | Kedem | 711/162 |
| 6,182,198 | B1 | * | 1/2001 | Hubis et al. | 711/162 |
| 6,434,681 | B1 | * | 8/2002 | Armangau | 711/162 |
| 6,792,518 | B2 | * | 9/2004 | Armangau et al. | 711/162 |
| 6,952,758 | B2 | * | 10/2005 | Chron et al. | 711/162 |
| 2002/0004890 | A1 | * | 1/2002 | Ofek et al. | 711/161 |

* cited by examiner

Primary Examiner—Kevin L Ellis
Assistant Examiner—Ryan Bertram
(74) Attorney, Agent, or Firm—Campbell Stephenson LLP

(57) ABSTRACT

Enabling an off-host computer to migrate data of a data volume. In one embodiment, the off-host computer copies data contents of n data blocks of a first data volume to n data blocks, respectively, of a second data volume. A host computer is capable of modifying data contents of a first plurality of data blocks of the n data blocks of the first data volume after the off-host computer begins copying data contents of the n data blocks of the first data volume to the n data blocks, respectively, of the second data volume.

9 Claims, 7 Drawing Sheets

ENABLING OFF-HOST DATA MIGRATION USING VOLUME TRANSLATION MAPPINGS, SNAPPOINT MAPS AND LINKED VOLUME TECHNOLOGIES

BACKGROUND OF THE INVENTION

Data systems typically include one or more host computers (e.g., servers) and one or more storage systems (e.g., disk arrays) that store data used by applications executing on the host computers. The present invention will be described with reference to storage systems taking form in disk arrays, it being understood that the term storage systems should not be limited thereto. Each disk array typically includes several disk drives that store data. Applications access data on the disk drives via logical data objects. More particularly, applications executing on host computers usually access data stored in logical data objects, each of which directly or indirectly represent an aggregation of physical data objects (e.g., physical memory blocks, each of which stores or is configured to store 512 bytes of data) on disk drives. Logical data objects may take many different forms such as file systems, data volumes, etc. The present invention will be described with reference to one or more host computers accessing and/or processing data stored in one or more data volumes, it being understood that the present invention should not be limited thereto.

FIG. 1A illustrates relevant components of an example data system 10, which includes a host computer 12 coupled to a storage area network (SAN) 14. The SAN 14 includes a pair of disk arrays 20 and 22 accessible by one or more applications executing on host computer 12 via communication link 16. Host computer 12 includes a volume manager 24 in data communication with a mapping system 26. Volume manager 24 and mapping system 26 are shown as separate entities for ease of explanation. It is noted, however, the mapping system 26 may be a component of the volume manager 24 in an alternative embodiment. Volume managers and mapping systems, in one embodiment, may take form in instructions executing on one or more processors of a host computer.

Volume manager 24 and/or mapping system 26 operate to logically aggregate physical data objects (e.g., physical memory blocks) within disk arrays 20 or 22 to create one or more data volumes. For example, volume manager 24 and/or mapping system 26 logically aggregates physical memory blocks within disk array 20 to create data volume A, which is graphically represented in FIG. 1A. As shown, data volume A consists of n logical data blocks, each of which stores data of, for example, files of a file system. While it is said that a logical data block of a volume stores data, in reality, the data is stored in a physical memory block of a disk array allocated thereto. Mapping system 26 creates and maintains a volume translation map (hereinafter translation map) that maps the n data blocks of volume A to n physical memory blocks, respectively, within disk array 20. Volume manager 24 uses the translation map when implementing a request to read data from or write data to data blocks of volume A. Occasionally, data blocks of volume A are reallocated to different physical memory blocks of array 20. When this happens, mapping system 26 updates the translation map for volume A accordingly, to insure the proper physical memory block is accessed when volume manger 24 implements a request to read data from or write data to a particular logical block of volume A. It is noted that while volume A is represented in FIG. 1A as a set of contiguous logical data blocks, the logical data blocks may be mapped to noncontiguous physical memory blocks within disk array 20.

Volume manager 24 can implement a request generated by, for example, a file system manager (not shown) to read data from or write data to one or more data blocks within volume A. For purposes of explanation, it will be understood that volume manager 24 receives requests to read data from or write data to a single block of volume A, it being understood that the present invention should not be limited thereto. Suppose volume manager 24 receives a request to write data D to block x of volume A. Volume manager, in response to receiving the request, accesses the translation map for volume A to identify the physical memory block in array 20 mapped thereto where data D should be physically stored. Using one or more input/output transactions, the current contents of the logical block are copied from the physical memory block to cache memory within host computer 12. Some or all of the contents of the cached data is overwritten with data D in accordance with the received write request. Eventually, the contents of the physical memory block are replaced with the modified cached data, and the write request is considered complete.

SUMMARY OF THE INVENTION

In one embodiment of the present invention, an off-host computer copies data contents of n data blocks of a first data volume to n data blocks, respectively, of a second data volume. A host computer is capable of modifying data contents of a first plurality of data blocks of the n data blocks of the first data volume after the off-host computer begins copying data contents of the n data blocks of the first data volume to the n data blocks, respectively, of the second data volume.

BRIEF DESCRIPTION OF THE DRAWINGS

The present invention may be better understood, and its numerous objects, features, and advantages made apparent to those skilled in the art by referencing the accompanying drawings.

The use of the same reference symbols in the drawings indicates similar or identical items.

DETAILED DESCRIPTION

Figure 1A:
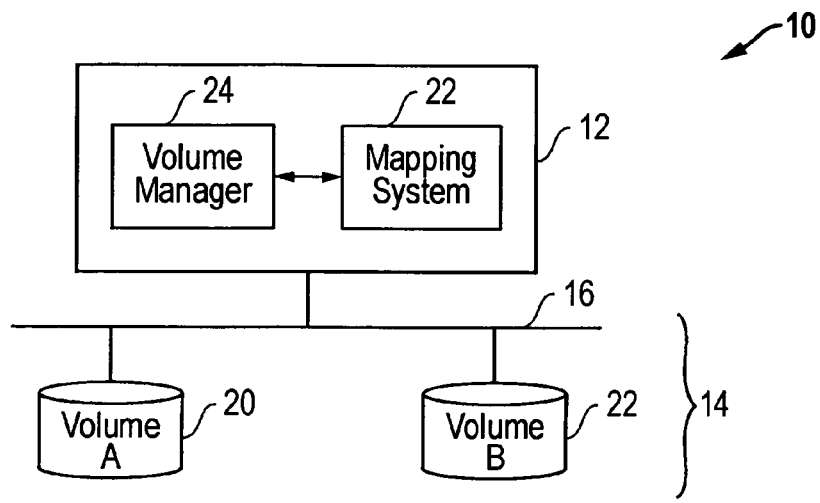
FIG. 1A is a block diagram illustrating relevant components of a data processing system employing one embodiment of a data migration process.

The present invention is directed to an apparatus and method for migrating data. In general, data migration can be seen as process of moving the contents of a data object, such as volume A of FIG. 1A, from one storage system (e.g., array 20) to another storage system (e.g., array 22). The present invention will be described with reference to migrating data of a single data volume (e.g., volume A) between a pair of disk arrays, it being understood that the present invention can be used to migrate several data volumes from a first set of one or more disk arrays to a second set of one or more disk arrays.

In the following description, the preferred embodiment of the present invention can be implemented as a computer program executing on one or more processors of one or more computers, although those skilled in the art will readily recognize that the equivalent of such software may also be constructed in hardware or a combination of hardware and software. If the invention is implemented as a computer program, the program may be stored as executable instructions in one or more conventional computer readable mediums that may include, for example: magnetic storage media such as a magnetic disk (e.g., a disk drive); optical storage media such as an optical disk; solid state electronics storage devices such as random access memory (RAM); or read-only memory (ROM); or any other device or medium employed to store or transmit computer program instructions.

There are many reasons to migrate data. One reason relates to the cost of leasing disk arrays. Some disk arrays are more expensive to lease than other disk arrays. An administrator of data system 10, seeking to reduce operating costs, may decide the contents of volume A should be migrated to a disk array (e.g., disk array 22) that is less expensive to lease when compared to the cost of leasing disk array 20. Data migration of volume A can be implemented by copying the contents of volume A stored on disk array 20 to disk array 22. Once disk array 22 contains a synchronized copy of volume A, volume manager 24 implements subsequent requests to read data from or write data to volume A using the copy stored on disk array 24.

Figure 2:
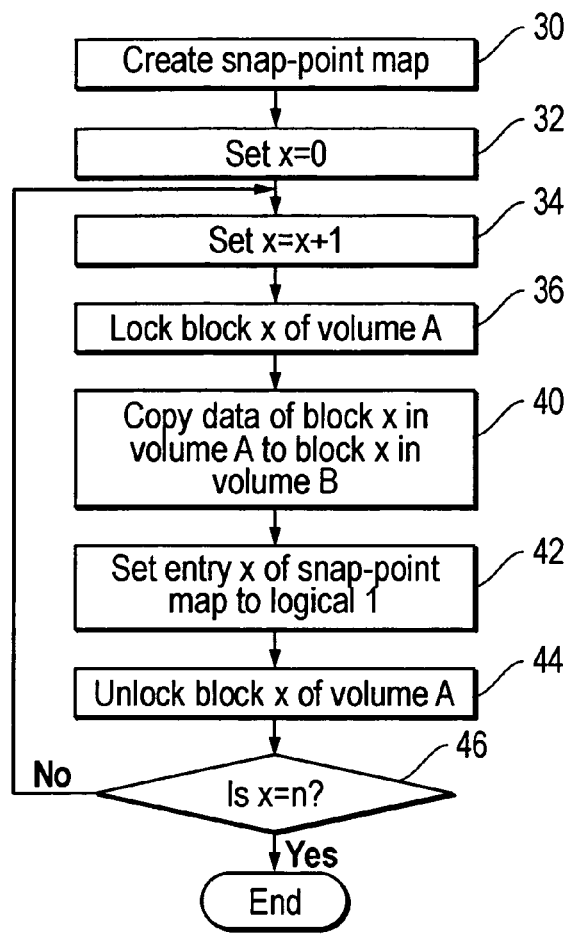
FIG. 2 is a flow chart illustrating relevant aspects of copying data from one volume to another.
Figure 3:
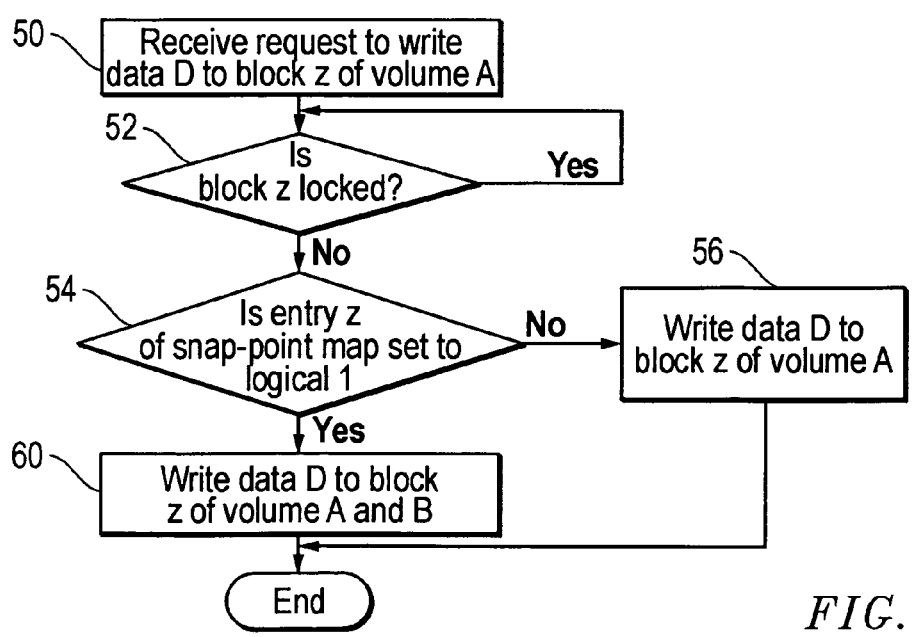
FIG. 3 is a flow chart illustrating relevant aspects of modifying data of a data volume while the contents of the data volume is being migrated.

Data migration can be a very resource intensive and time consuming activity. FIGS. 2 and 3 illustrate relevant aspects of a host computer based data migration process for migrating data of volume A from disk array 20 to disk array 22. Before the processes in FIGS. 2 and 3 can begin, volume manager 24 and/or mapping system 26 create an empty target volume (i.e., volume B) by logically aggregating physical blocks within the disk array 22. FIG. 1A illustrates a graphical representation of volume B when first created, which includes n blocks corresponding to the n blocks, respectively, of volume A. Mapping system 26 can create a translation map for volume B which maps each of its n blocks to respective physical blocks within disk array 22. Initially volume B contains no data as shown in FIG. 1. Eventually, however, the contents of the n blocks of volume A will be copied to the n blocks, respectively, of volume B. Like volume A, each of the n blocks of volume B is contiguous; however, in reality, the n blocks of volume B may be mapped to respective noncontiguous physical blocks within disk array 22.

Once empty volume B is created, the processes shown within FIGS. 2 and 3 can begin. With reference to FIG. 2, volume manager 24 creates a snap-point map (not shown) in memory of host computer 12 as shown in step 30. The snap-point map can be used in this migration process to synchronize volumes A and B as will be more fully described below. The snap-point map contains n entries corresponding to the n blocks, respectively, of volume A. Each entry can store a bit set to logical 1 or 0. Initially, the bit in each entry is set to logical 0.

In step 32 the volume manager 26 sets a counter x to 0. Counter x can track blocks of volume A that have been copied to volume B during the process of FIG. 2. In step 34 volume manager 24 increments x by 1. Thereafter, volume manager 24 locks block x of volume A as shown in 36. When a block is locked, data of that bock cannot be modified until it is unlocked. Locking the data ensures the data will not be modified while the data of the block is migrated (i.e., copied) to its corresponding block in volume B. Without locking the block, volume manager 24 cannot guarantee the contents of volume B will be synchronized to the contents of volume A at the end of the migration process. It is noted that in a distributed volume manager system in which several host computers have access to volume A, volume manager 24 must coordinate with the other host computers when locking block x in step 36 to ensure that none of the other host computers will access and subsequently modify data in block x while it is being copied to block x of volume B. For purposes of explanation, the processes shown in FIGS. 2 and 3 will be described with respect to host computer 12 having sole access to volumes A and B.

After block x is blocked in step 36, volume manager 24 copies the contents of block x in volume A to block x in volume B as shown in step 40. As an aside, volume manager 24 uses the most recent version of the translation map for volume A to identify the physical block corresponding to block x in volume A from which data is copied. Moreover, volume manager 24 uses the most recent version of translation map for volume B to identify the physical block in disk array 22 where the contents of block x should be copied. Once the data of block x is copied to block x of volume B, volume manager 42 sets entry x of the snap-point map created in step 30 to logical 1, thus indicating that data of block x in volume A has been copied to volume B. In step 44, volume manager 24 unlocks block x of volume A. Once unlocked, data in block x may be modified in accordance with a write request received from, for example, a file system manager executing on host computer 12. In step 46, volume manager compares x to n, the total number of data blocks in volume A. If x equals n, then all blocks of volume A have been copied to respective blocks in volume B in accordance with the process shown in steps 36-44 and the process ends. Otherwise, steps 34-46 are repeated until x equals n.

During the migration process shown in FIG. 2, data blocks in volume A may be modified in accordance with write requests received from, for example, a file system manager (not shown). Any block in volume A may be modified in accordance with a received write request, so long as the data block is not locked. FIG. 3 illustrates an example process for implementing a write request during the process shown within FIG. 2.

The process shown in FIG. 3 starts when volume manager 24 receives a request to write new data D to block z of volume A. In step 52, volume manager 52 determines whether block z is locked. If block z is not locked or when block z is subsequently unlocked, volume manager reads the value stored in entry z of the snap-point map created and/or updated in the process of FIG. 2. If entry z is set to logical 1, then block z of volume B contains a copy of the data in block z of volume A. To maintain consistency between volumes A and B, if entry z of snap-point map set to logical 1, volume manager 24 writes data D to block z of both volumes A and B. However, if block z of volume A has yet to be copied to block z of volume B, volume manager 24 writes data D only to block z of volume A, since the contents of block z of volume A will eventually be copied to block z of volume B in accordance with process shown in FIG. 2. Once the process shown in FIGS. 2 and 3 have completed, volume A and volume B should contain synchronized data. Volume B can then be designated as the production volume (i.e., the new volume A) that stores data to be processed in accordance with subsequent requests received by volume manager 24.

One of ordinary skill in the art will recognize that locking and unlocking blocks, writing data to block z of volumes A and B, in addition to the other steps shown in FIGS. 2 and 3 (or otherwise not shown), increases the processing load on host computer 12. The increased processing load, in turn, reduces the ability, for example, of volume manger 24 to implement requests to read data from or write data to volume A in a timely manner. Thus, the increased processing load translates into slower response time for applications executing on host computer 12. Further, in a distributed system in which several host computers, in addition to host computer 12, have access to volume A, the response time of any host computer to complete a request to read data from or write data to volume A, will be additionally slowed. The increased processing load may be unacceptable to an administrator who seeks to quickly migrate data from one storage system to another. An alternative method of migrating data, which reduces the burden on a host computer, is sought.

Figure 1B:
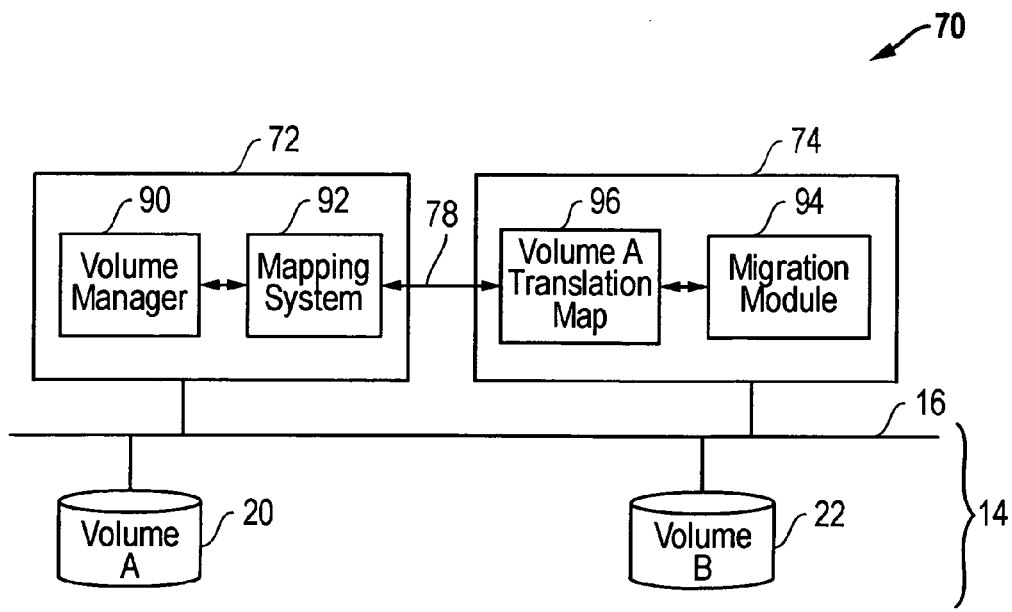
FIG. 1B is a block diagram illustrating relevant components of a data processing system employing an alternative embodiment of a data migration process.

FIG. 1B illustrates relevant components of a data system 70 which employs one embodiment of an alternative method of migrating data. Data system 70 is the data system 10 of FIG. 1A with host computer 12 replaced by host computer 72 and the addition of off-host computer 74. The off-host computer 74, as will be more fully described below, can be used to copy data from a production volume (e.g., volume A) to a target volume (e.g., volume B) during the alternative method of migrating data. Data system 70 additionally includes a communication link 86 between host computer 72 and off-host computer 74 which will be more fully described below. It should be understood, however, that any data transmitted between host computer 72 and off-host computer 74 via communication link 86 alternatively may be transmitted via communication link 16.

Host computer 72 includes a volume manager 90 and a mapping system 92. The mapping system 92 could be a component of volume manager 90 in an alternative embodiment. However, for ease of explanation, volume manager 90 and mapping system 92 will be described as separate entities within host computer 72. In one embodiment, volume manager 90 and mapping system 92 take form in instructions executing on one or more processors (not shown) in host computer 72, it being understood that the present invention should not be limited thereto. Off-host computer 74 includes a migration module 94 in data communication with a memory 96, which in turn stores translation maps generated by mapping system 92 and/or migration module 94. Migration module 94 may take form in instructions executing on one or more processors of off-host computer 74, it being understood that the present invention should not be limited thereto.

Volume manager 90 can create and manage the same volume A shown in FIG. 1A and described above. Migration module 74 or volume manager 90 can create the same volume B shown in FIG. 1A and described above. Volume B will be the target of the alternative migration process described below. Volume manager 90 and mapping system 92 may also provide configuration information (other than a translation map) for volume A, which may be needed by migration module 94 to implement the migration of data from volume A to volume B more fully described below. For explanation purposes only, volume A will contain n data blocks during the migration process described below.

Mapping system 92 can create and update a translation map for volume A. For purposes of explanation only, it will be presumed the translation map for volume A remains unchanged during the migration process described below. The translation map for volume A maps the n data blocks of volume A to n physical memory blocks, respectively, within disk array 20. Mapping system 92 can transmit a copy of the translation map for volume A to off-host computer 74 via communication link 76. The translation map provided to off-host computer 74 may be stored in memory 96. Migration module 94 or mapping system 92 can create and update a translation map for volume B. For purposes of explanation only, it will be presumed the translation map for volume B remains unchanged during the migration process described below. The translation map for volume B maps the n data blocks of volume B to n physical memory blocks, respectively, within disk array 22. The translation map for volume B may also be stored in memory 96. As will be more fully described below, migration module 94 may use the translation maps for volumes A and B when copying data from volume A to volume B.

FIGS. 4-8 illustrate relevant aspects of an alternative process for migrating data of volume A in accordance with one embodiment of the present invention. The process is divided into three phases. In the first two phases migration module 94, not volume manager 90, copies data contents of blocks within volume A to respective blocks of volume B. In the last phase, volume manager may copy data contents of one or more blocks in volume A to one or more blocks, respectively, in volume B. However, the time needed to complete the third phase should be substantially less than the time needed to complete the first two phases. During each phase, volume manager 90 can implement requests received from, for example, a file system manager to modify data within volume A. However, as more fully described below, volume manager 90 isn't required to lock and subsequently unlock data blocks during the first and second phases when volume manager 90 receives a request to write data to volume A. Further, volume manager 90, as more fully described below, isn't required to write new data to respective blocks of volumes A and B during the first two phases when volume manager 90 receives a request to write data to volume A. Ultimately, the processing burdens imposed on host computer 72 during migration of volume A using the alternative embodiment described below, should be less than the processing burdens imposed on host computer 12 using the migration process described above.

Figure 4:
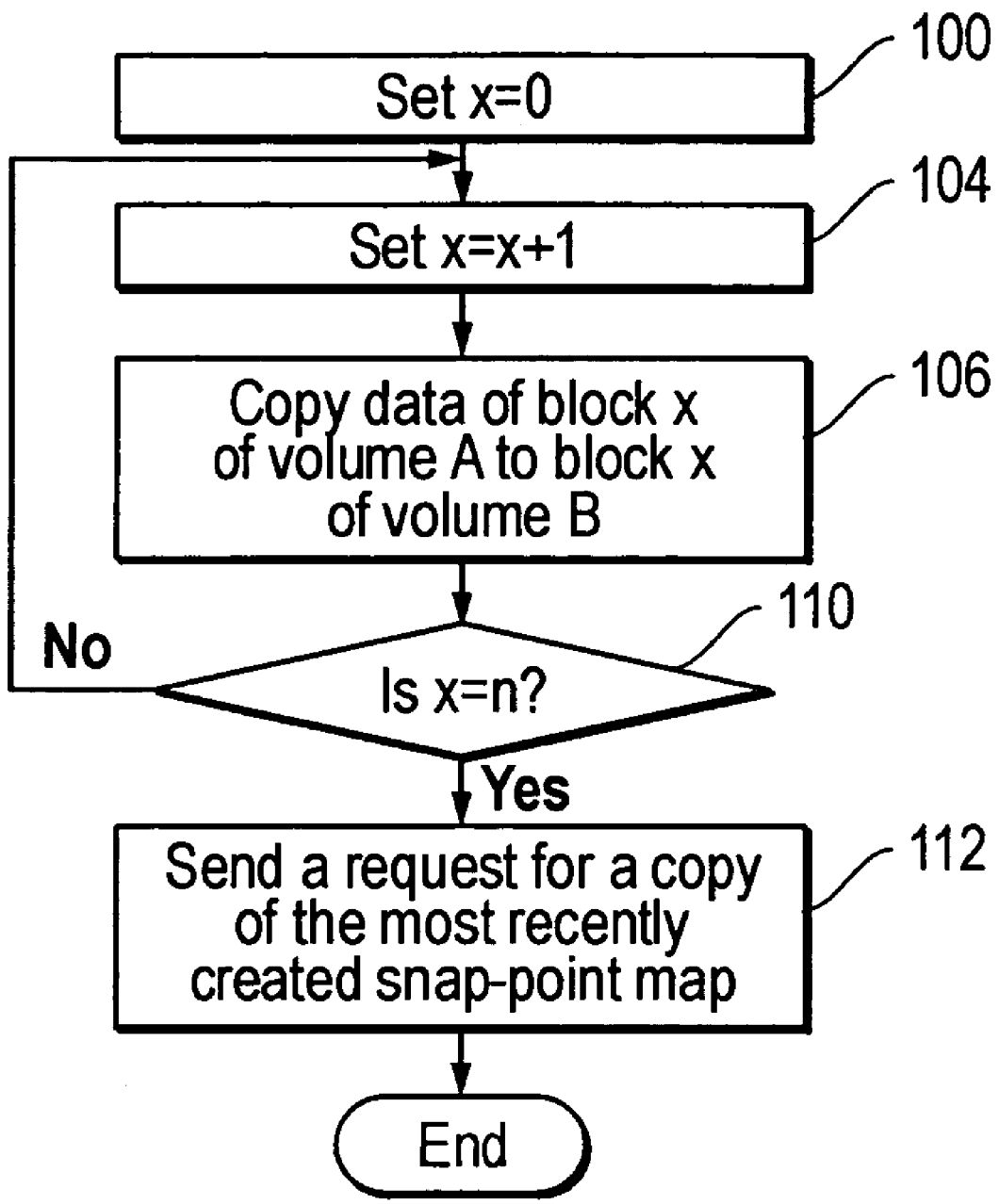
FIG. 4 is a flow chart illustrating relevant aspects of copying data from one volume to another.

With reference to FIG. 4, the first phase of the alternative migration process starts with step 100 when migration module 94 sets counter x to 0. Counter x, as will be more fully described below, tracks those blocks of volume A that have been copied to volume B during the process shown in FIG. 4. In step 104, migration module 94 increments x by 1. In step 106 migration module 94 copies the data of block x from volume A to block x of volume B. While it is said that migration module 94 copies data x of volume A to block x of volume B, in reality migration module 94 copies the data in the physical block of array 20 mapped to block x of volume A to the physical block of array 22 mapped to block x of volume B. Migration module 94 uses the translation maps for volumes A and B accessible in memory 96 when copying data between volume A and volume B. In step 110, migration module 94 compares its counter x to n, the total number of blocks within volume A. Here, the off-host computer 74 determines whether it has copied all blocks of volume A to respective blocks in volume B. If x does not equal n, then steps 104-110 are repeated. When x equals n, migration module sends a request to volume manager 90 for a copy of the most recently created snap-point map including any updates thereto, and the first phase ends. Once the first phase ends, the second phase, as described in FIG. 6, begins.

Figure 5:
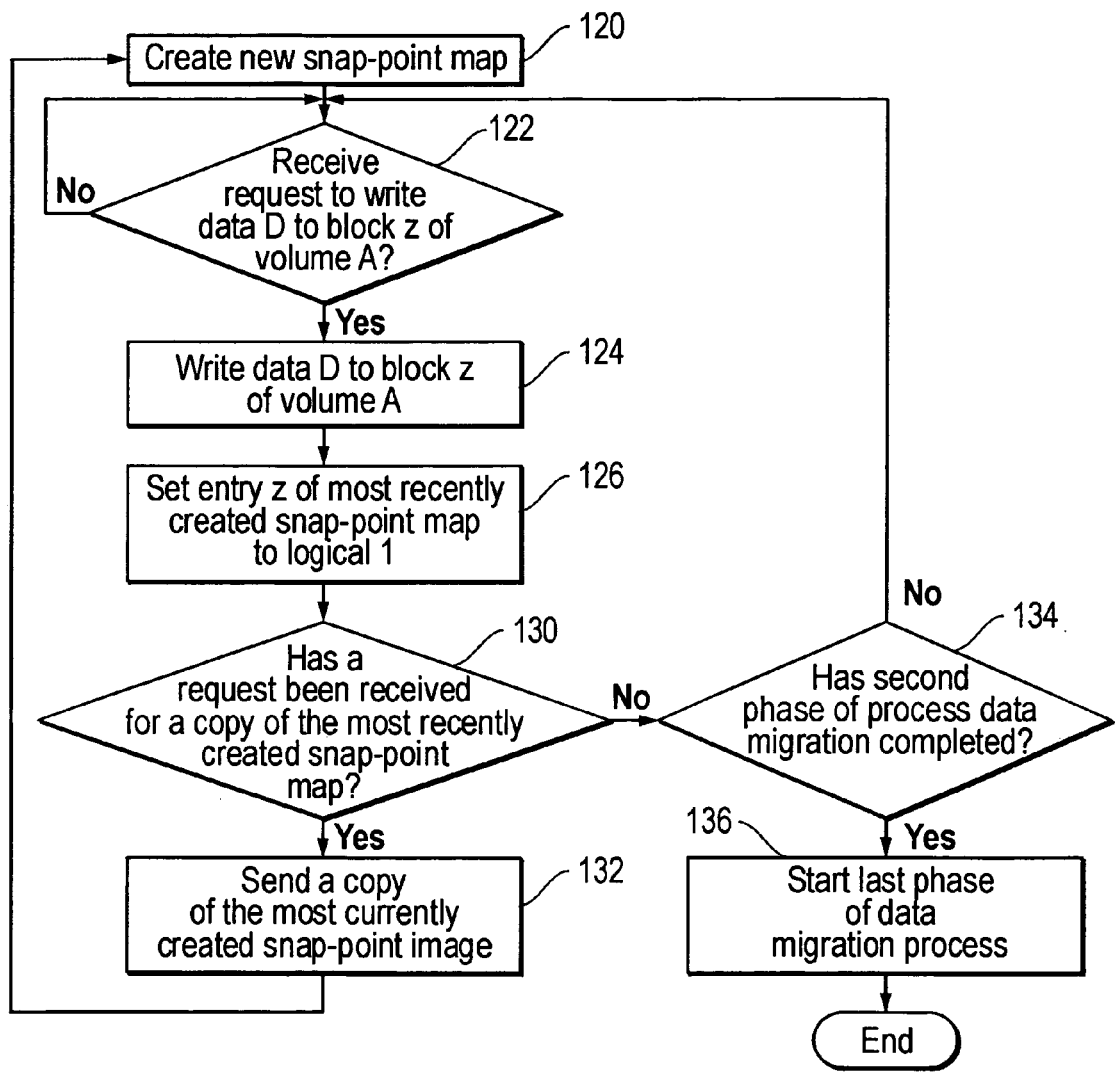
FIG. 5 is a flow chart illustrating relevant aspects of modifying data of a data volume while the contents of the data volume is being migrated.

During all phases of the alternative migration process, volume manager 90 as noted above can implement write requests received from, for example, a file system manager. FIG. 5 illustrates relevant aspects of an example process performed by volume manager 90 while implementing write requests during the first and second phases of the migration process. It is noted that the process of FIG. 5 first starts at or about the same time the process shown in FIG. 4 starts. With continuing reference to FIG. 4; volume manager 90 creates a new snap-point map as shown in step 120. This snap-point map is used to track those blocks in volume A which have been modified during the migration process. Tracking those blocks of volume A that have been modified, is important during the second and third migration phases described below. Each new snap-point map created by host computer 72 in step 120 includes n entries corresponding to the n data blocks of volume A. Each entry stores a one-bit value set to logical 1 or 0. When set to logical 1, the bit indicates data in the corresponding block in volume A has been modified since creation of the snap-point map. When set to logical 0, the entry indicates data in the corresponding block in volume A has not been modified.

In step 122 of FIG. 5, host computer 72 waits to receive a request to write data D to block z of volume A. When the request is received, volume manager 90 writes data D to block z using the process described in the Background section above. After data D is written to block z in step 122, entry z of the most recently created snap-point map is set to logical 1 as shown in step 126.

The alternative migration process, as noted above, consists of three phases. During the first phase, migration module 94 copies the contents of the n blocks of volume A to the n blocks, respectively, of volume B as shown in FIG. 4. In the last step of FIG. 4, migration module 94 sends a request for a copy of the snap-point map most recently created by volume manager 90. The second phase of the alternative migration process starts after the last step of FIG. 4 is implemented. In the second phase, as will be more fully described below with reference to FIG. 6, migration module 94 copies data in those blocks of volume A which were modified subsequent to the start of the first phase. Migration module 94 may again request a copy of the most recently created snap-point map during the second phase. If volume manager 90 has received a request for a copy of the most recently created snap-point map when step 130 is implemented, volume manager 90 in step 132 sends migration module 94 a copy of the most recently created snap-point map, which may include one or more entries with bits set to logical 1. Thereafter, volume manager creates a new snap-point map in step 120. The bits of entries of the new snap-point map are initially set to logical 0. After creation of the snap-point map, volume manager 90 waits to receive another request to write data to volume A. If, however, volume manager has not received a request from migration module 94 for a copy of the most recently created snap-point map at step 130, then volume manager 90 checks to see whether it has received notice from migration module 94 that the second phase of the alternative migration process has ended. If it has, volume manager 90 begins the third and final stage of the migration process described in greater detail in FIGS. 7 and 8.

Figure 6:
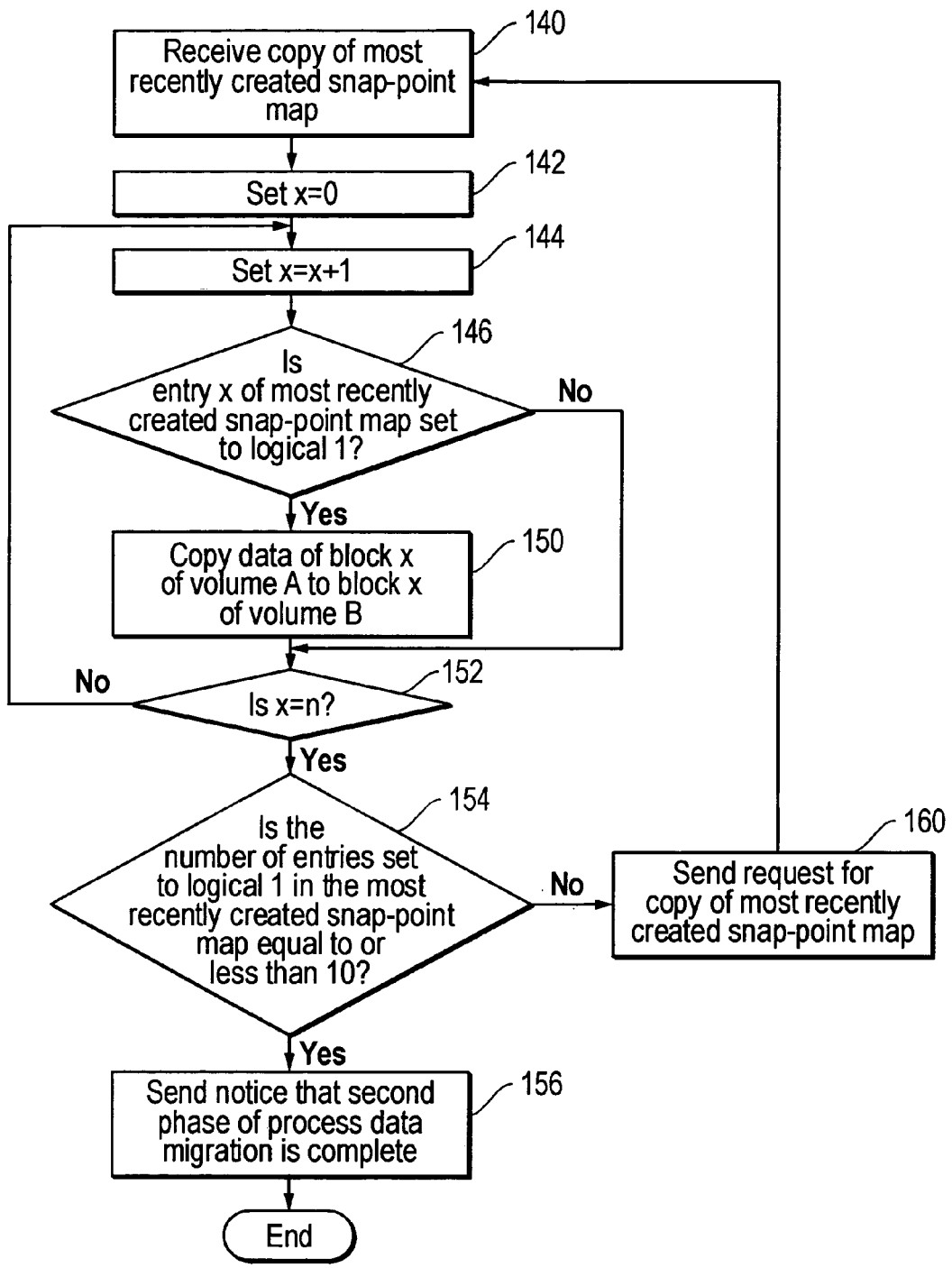
FIG. 6 is a flow chart illustrating relevant aspects of copying data from one volume to another.

FIG. 6 illustrates relevant aspects implemented by migration module 94 during the second phase of the data migration process. The process shown in FIG. 6 initiates when migration module 94 receives a copy of the first snap-point map created by the process shown in FIG. 5 in response to the request sent by migration module 94 in step 112 of FIG. 4. The process in FIG. 6 is similar to the process shown within FIG. 4. Migration module 94 sets counter x to 0 in step 142, and increments counter x by 1 in step 144. In step 146, migration module 94 accesses the most recently created snap-point map received in step 140 to determine the value of entry x therein. If entry x of that snap-point map is set to logical 1, then data of block x of volume A has been modified since the start of the first phase, which means that block x of volume B does not contain an identical copy of block x in volume A. To correct this inconsistency, volume manager 90 copies the data of block x of volume A to block x of volume B as shown in step 150. Thereafter or after migration module 94 determines entry x in the snap-point map is set to logical 0, migration module 94 compares counter x to n. If x does not equal n, x is incremented in step 144, and the next entry of the most recently created, steps 144-152 are repeated until x is equal to n. When x equals n, migration module 94 determines the total number of entries of the most recently created snap-point map which were set to logical 1. If the total number is more than a predetermined value (e.g., 10), migration module 94 sends a request to volume manager 90 for a copy of the snap-point map most recently created by volume manager 94 as shown in step 160, and steps 140-154 are repeated. Otherwise, migration module 94 sends a notice to volume manager 90 that the second phase of the migration process has completed as shown in step 156, which instructs volume manager 90 to eventually begin the last phase of the alternative migration process.

Figure 7:
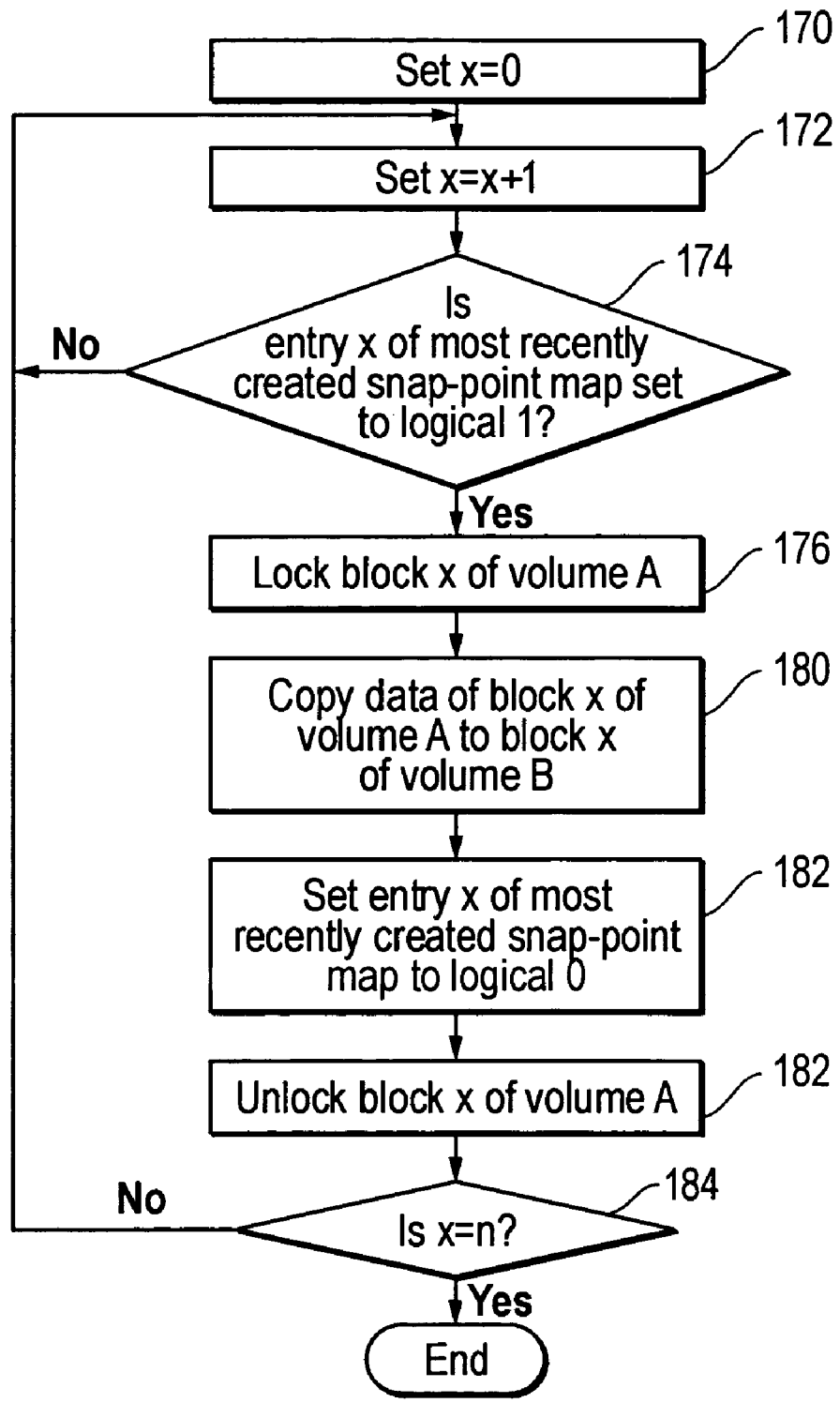
FIG. 7 is a flow chart illustrating relevant aspects of copying data from one volume to another.
Figure 8:
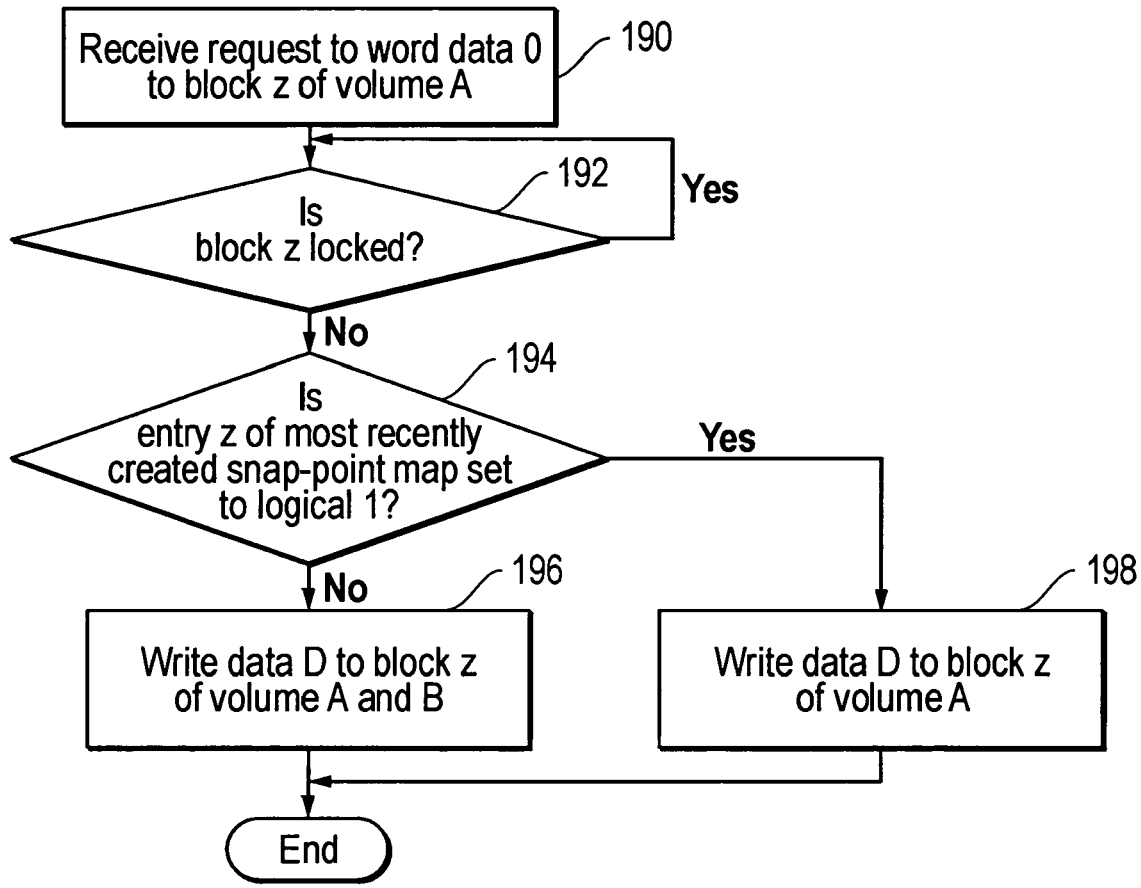
FIG. 8 is a flow chart illustrating relevant aspects of modifying data of a data volume while the contents of the data volume is being migrated.

FIGS. 7 and 8 define one example of the third and last phase of the alternative migration process. The processes of FIGS. 7 and 8 are similar to that shown in FIGS. 2 and 3, respectively. Unlike the process shown in FIG. 2, however, the process in FIG. 7 does not start with the creation of a new snap-point map. Importantly, the time needed for volume manager 90 to complete the processes in FIGS. 7 and 8 should be less than the time needed by volume manager 24 to complete the processes in FIGS. 2 and 3. Once, the third phase of the migration process ends, volume A and volume B should contain synchronized data. Volume B can then be designated as the production volume (i.e., the new volume A) that stores data to be processed in accordance with subsequent requests received by volume manager 90.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

It was presumed the translation map for volume A remains unchanged during the migration process described above. The present invention should not be limited thereto. The present invention can be employed in a system in which the translation map changes during the course of data migration. When, for example, mapping system 92 updates the translation map for volume A, the translation map for volume A stored in memory 96 should be refreshed accordingly. It is not necessary that the translation map in memory 96 be updated every time mapping system 92 updates the translation map for volume A. If there is a substantial delay between refreshing the translation map for volume A, then migration module may have to recopy the contents of data blocks in volume A to respective blocks in volume B in order to insure consistency of data between volumes A and B.

What is claimed is:

1. A method comprising:
   a first computer copying data contents of n data blocks of a first data volume to n data blocks, respectively, of a second data volume;
   a second computer modifying data contents of a first plurality of the n data blocks of the first data volume after the first computer begins copying data contents of the n data blocks of the first data volume to the n data blocks, respectively, of the second data volume;
   the second computer creating a volume translation map which maps the n data blocks of the first data volume to n physical memory blocks, respectively, of a data storage system;
   the first computer receiving a copy of the volume translation map from the second computer;
   the first computer using the copy of the volume translation map to copy data contents of the n data blocks of the first data volume to the n data blocks, respectively, of the second data volume;
   the second computer creating a first snap-point map before contents of any of the n data blocks of the first data volume are copied to the n data blocks, respectively, of the second data volume;
   wherein the first snap-point map comprises n bits corresponding to the n data blocks, respectively, of the first data volume;
   wherein all of the n bits of the first snap-point map are initially set to indicate that data contents of the n data blocks, respectively, have not been modified since creation of the first snap-point map;
   the second computer setting a first plurality of the n bits, wherein the first plurality of the n bits correspond to the first plurality of data blocks, wherein the first plurality of n bits are set to indicate that data contents of the first plurality of data blocks, respectively, have been modified since creation of the first snap-point map;
   transmitting a copy of the first snap-point map to the first computer after the second computer sets the first plurality of n bits;
   after the first computer copies data contents of the n data blocks of the first data volume to the n data blocks, respectively, of the second data volume, the first computer copying data contents of the first plurality of data blocks of the first volume to respective blocks of the second volume;
   the second computer creating a second snap-point map after creation of the first snap-point map, wherein the second snap-point map comprises n bits corresponding to the n data blocks, respectively, of the first data volume;
   wherein the n bits of the second snap-point map are initially set to indicate that data contents of the n data blocks, respectively, have not been modified since creation of the second snap-point map.

2. The method of claim 1 further comprising:
   the second computer modifying data contents of a second plurality of the n data blocks of the first volume while or after the first computer copies data contents of the first plurality of data blocks of the first volume to respective blocks of the second volume;
   the second computer setting a second plurality of bits of the second snap-point map, wherein the second plurality of bits of the second snap-point map correspond to the second plurality of data blocks, respectively, of the first volume, wherein the second computer sets the second plurality of bits of the second snap-point map to indicate that data contents of the second plurality of data blocks of the first data volume have been modified since creation of the second snap-point map.

3. The method of claim 2 further comprising:
   the first computer receiving a copy of the second snap-point map after the second computer sets the second plurality of bits of the second snap-point map;
   after the first computer copies data contents of the first plurality of data blocks of the first data volume to respective data blocks of the second data volume, the first computer copying data contents of the second plurality of data blocks of the first volume to respective blocks of the second volume.

4. The method of claim 2 further comprising:
   after the first computer copies data contents of the first plurality of data blocks of the first data volume to respective data blocks of the second data volume, the second computer copying data contents of the second plurality of data blocks of the first volume to respective data blocks of the second data volume;
   the second computer receiving a request to modify data of a first data block of the first data volume while the second computer copies data contents of the second plurality of data blocks of the first volume to respective data blocks of the second data volume;
   the second computer accessing the second snap-point map to determine whether a first bit corresponding to the first data block of the first data volume, has been set to indicate that contents of the first data block has been modified since creation of the second snap-point map.

5. A computer readable memory storing instructions executable by a first computer, wherein the first computer implements a method in response to executing the instructions, the method comprising:
   copying data contents of n data blocks of a first data volume to n data blocks, respectively, of a second data volume, while a second computer modifies data contents of a first plurality of the n data blocks of the first data volume;
   using a copy of a volume translation map received from the second computer to copy data contents of the n data blocks of the first data volume to the n data blocks, respectively, of the second data volume, wherein the translation map maps the n data blocks of the first data volume to n physical memory blocks, respectively, of a data storage system;
   the first computer receiving a copy of a first snap-point map from the second computer after the first computer copies data contents of the n data blocks of the first volume to the n data blocks, respectively, of the second data volume, wherein the first snap-point map comprises n bits corresponding to the n data blocks, respectively, of the first data volume;
   the first computer, after copying data contents of the n data blocks of the first data volume to the n data blocks, respectively, of the second data volume, copying data contents of a first plurality of data blocks of the first volume to respective blocks of the second volume in response to receiving the copy of the first snap-point map, wherein a first plurality of the n bits in the first snap-point map are set to indicate that the first plurality of data blocks, respectively, of the first data volume were modified after the first computer began copying the n data blocks of the first data volume to the n data blocks, respectively, of the second data volume;
   the first computer storing a copy of a second snap-point map received from the second computer after the first computer receives the copy of the first snap-point map, wherein the second snap-point map comprises n bits corresponding to the n data blocks, respectively, of the first data volume.

6. The computer readable memory of claim 5 wherein a second plurality of bits of the second snap-point map copy are set to indicate that data contents of a second plurality of data blocks, respectively, of the first data volume have been modified.

7. The computer readable memory of claim 6 wherein the method further comprises the first computer, after copying data contents of the first plurality of data blocks of the first data volume to respective data blocks of the second data volume, copying data contents of the second plurality of data blocks of the first volume to respective blocks of the second volume.

8. The computer readable memory of claim 7 wherein the method further comprises the first computer comparing a predetermined value to the number of bits in the first snap-point map set to indicate that contents of respective data blocks in the first data volume have been modified;

the first computer transmitting a request to the second computer in response to the first computer determining that the number of bits is greater than the predetermined value.

9. The computer readable memory of claim 5 wherein the method further comprises the first computer comparing a predetermined value to the number of bits in the first snap-point map set to indicate that contents of respective data blocks in the first data volume have been modified;

the first computer transmitting a message to the second computer in response to the first computer determining that the number of bits is less than the predetermined value, wherein the message indicates that the first computer will no longer copy contents of a data block from the first data volume to the second data volume.

* * * * *